US011522697B2

(12) United States Patent
Zimmer et al.

(10) Patent No.: US 11,522,697 B2
(45) Date of Patent: Dec. 6, 2022

(54) INSIGHT GENERATION USING PERSONAL IDENTIFIABLE INFORMATION (PII) FOOTPRINT MODELING

(71) Applicant: Bank of America Corporation, Charlotte, NC (US)

(72) Inventors: Allison Zimmer, Charlotte, NC (US); Brian H. Corr, Charlotte, NC (US); Charlene L. Ramsue, Statesville, NC (US); Scott Nielsen, Charlotte, NC (US); Thomas G. Frost, Charlotte, NC (US); Youshika C. Scott, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/232,517

(22) Filed: Apr. 16, 2021

(65) Prior Publication Data
US 2022/0337412 A1 Oct. 20, 2022

(51) Int. Cl.
*H04L 9/32* (2006.01)
*H04L 9/40* (2022.01)
*G06N 20/00* (2019.01)

(52) U.S. Cl.
CPC .............. *H04L 9/32* (2013.01); *G06N 20/00* (2019.01); *H04L 63/0428* (2013.01)

(58) Field of Classification Search
CPC ........ H04L 9/32; H04L 63/0428; G06N 20/00
USPC ....................................................... 713/168
See application file for complete search history.

(56) References Cited

U.S. PATENT DOCUMENTS

| | | | |
|---|---|---|---|
| 7,724,918 B2 | 5/2010 | Balakrishnan et al. | |
| 8,447,630 B2 | 5/2013 | O'Brien et al. | |
| 8,649,552 B2 | 2/2014 | Balakrishnan et al. | |
| 9,235,630 B1 | 1/2016 | Dietrich et al. | |
| 9,288,184 B1 * | 3/2016 | Kvamme | ................ H04L 63/10 |
| 9,372,972 B2 | 6/2016 | Coxe et al. | |
| 9,519,794 B2 | 12/2016 | Fox et al. | |
| 9,594,849 B1 | 3/2017 | Todd et al. | |
| 9,792,609 B2 | 10/2017 | Burke et al. | |
| 9,892,278 B2 | 2/2018 | Avrahami et al. | |

(Continued)

FOREIGN PATENT DOCUMENTS

CA 2801659 A1 7/2013

*Primary Examiner* — Amare F Tabor
(74) *Attorney, Agent, or Firm* — Banner & Witcoff, Ltd.

(57) ABSTRACT

Aspects of the disclosure relate to information masking. A computing platform may receive, from a user computing device, a request to access information that includes personal identifiable information (PII). The computing platform may retrieve source data comprising the PII and mask, within the source data and based on a data management policy, the PII. The computing platform may send the masked information in response to the request to access the information. The computing platform may receive a request to unmask the masked information and unmask the PII. The computing platform may log the request to unmask the masked information in an unmasking event log and send the unmasked PII in response to the request to unmask the masked information. The computing platform may apply a machine learning model to the unmasking event log to identify malicious events and trigger remediation actions based on identification of the malicious events.

19 Claims, 16 Drawing Sheets

(56) References Cited

U.S. PATENT DOCUMENTS

| | | | |
|---|---|---|---|
| 9,904,798 B2 | 2/2018 | Avrahami et al. | |
| 9,959,397 B1* | 5/2018 | Kvamme | H04L 63/08 |
| 10,025,952 B1 | 7/2018 | Wang et al. | |
| 10,142,320 B2 | 11/2018 | Coxe et al. | |
| 10,460,129 B2 | 10/2019 | Norris et al. | |
| 10,498,772 B2 | 12/2019 | Adhar | |
| 10,546,154 B2* | 1/2020 | Praveen | G06K 9/00536 |
| 10,592,693 B2 | 3/2020 | Norris et al. | |
| 10,776,519 B2 | 9/2020 | Gordon et al. | |
| 10,803,160 B2 | 10/2020 | Tussy | |
| 10,803,196 B2 | 10/2020 | Bodegas Martinez et al. | |
| 10,819,710 B2 | 10/2020 | Buford et al. | |
| 10,839,104 B2 | 11/2020 | Balzer et al. | |
| 10,855,634 B2 | 12/2020 | Papa et al. | |
| 10,880,405 B2 | 12/2020 | Cooley et al. | |
| 10,891,621 B2 | 1/2021 | Oka et al. | |
| 2021/0004485 A1 | 1/2021 | Summers et al. | |
| 2021/0279362 A1* | 9/2021 | Sahasranaman | G06F 21/77 |
| 2022/0121772 A1* | 4/2022 | Singh | G06F 21/6227 |
| 2022/0138345 A1* | 5/2022 | Krishnan | G06N 3/08 726/26 |

* cited by examiner

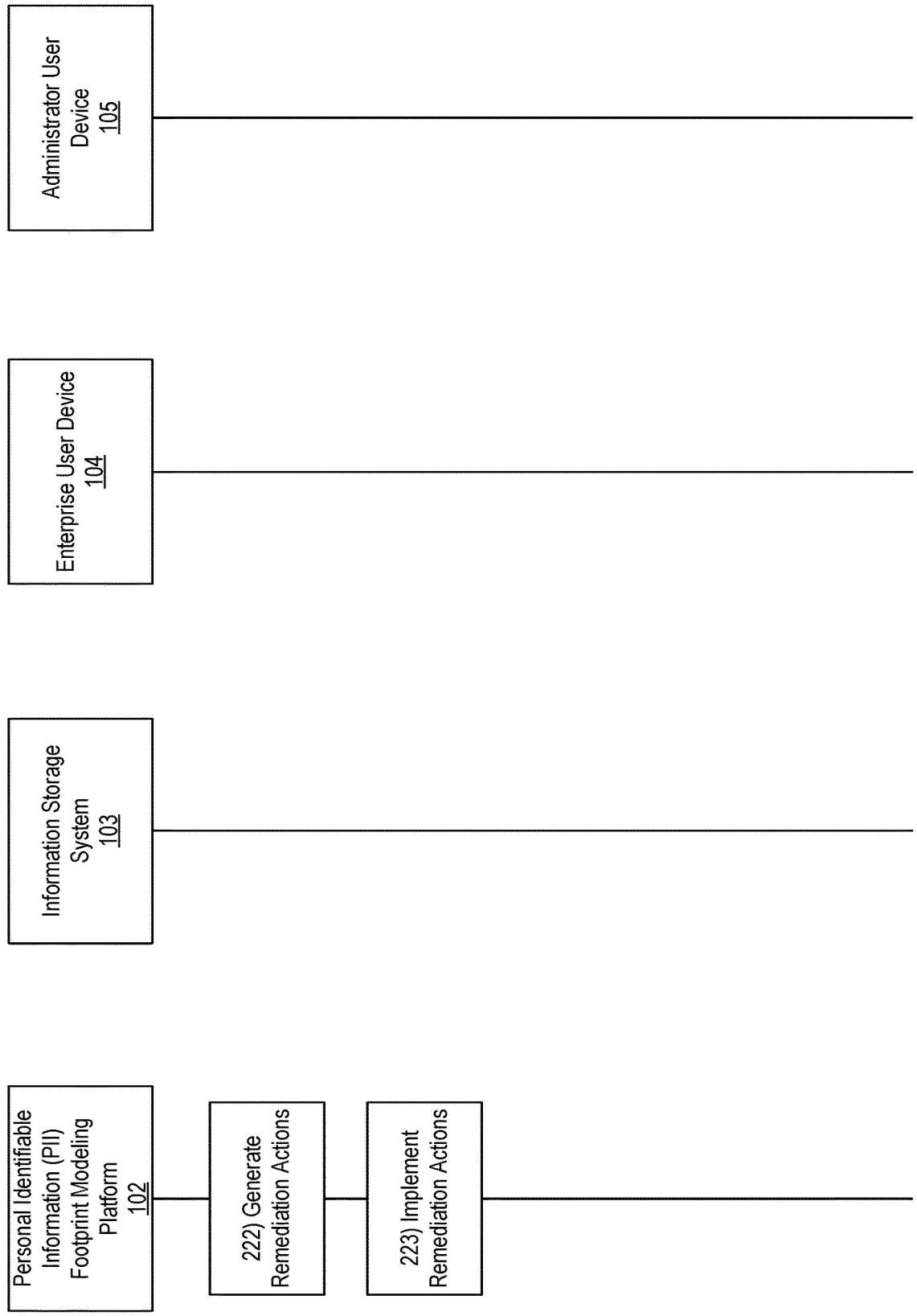

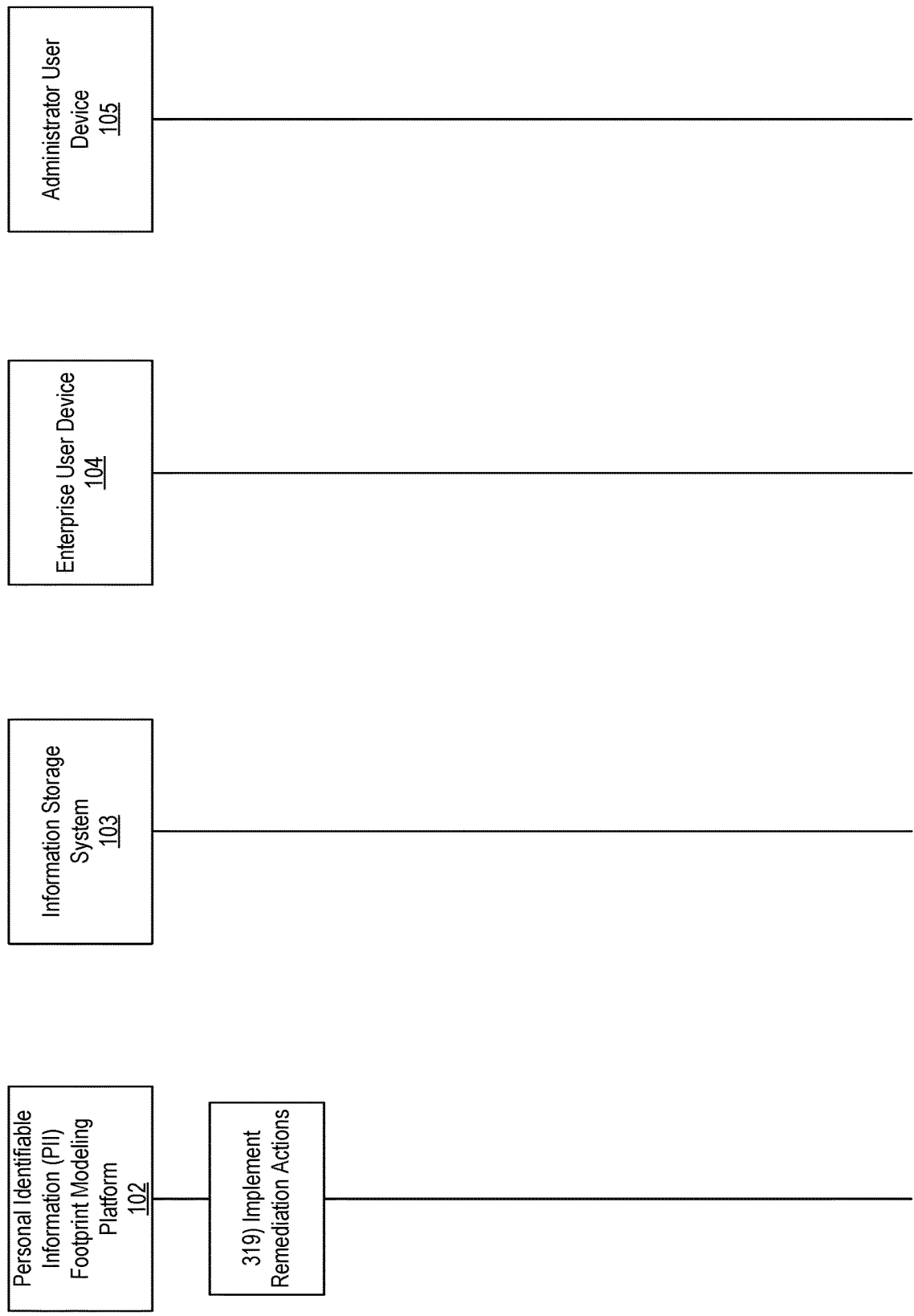

605

Information Response Interface

Name: Customer #1

Date of Birth: xx/xx/xxxx

Account Number: Account Number #1

Social Security Number: █████

Updated Information Response Interface

Name: Customer #1

Date of Birth: xx/xx/xxxx

Account Number: Account Number #1

Social Security Number: SSN #1

FIG. 7

INSIGHT GENERATION USING PERSONAL IDENTIFIABLE INFORMATION (PII) FOOTPRINT MODELING

BACKGROUND

Aspects of the disclosure relate to securely maintaining and controlling access to personal identifiable information (PII). In particular, one or more aspects of the disclosure relate to providing improved PII security using machine learning techniques.

In some instances, employees of an enterprise organization may need to access PII (e.g., of customers or other individuals) for legitimate business operations of the organization. Such access to PII, however, creates risk of attempts to compromise sensitive PII and/or perform other nefarious behaviors/malicious events using the PII. Nevertheless, in some instances, it may be necessary for certain employees to access certain PII to perform their job functions and/or to complete certain customer requests.

SUMMARY

Aspects of the disclosure provide effective, efficient, scalable, and convenient technical solutions that address and overcome the technical problems associated with enterprise tracking and/or access mechanisms related to PII so as to maximize PII safety and security without impeding task completion by employees and/or other legitimate functions. In some instances, this may be accomplished through masking of PII and logging requests to unmask such PII for malicious event detection in enterprise computing networks. In accordance with one or more embodiments of the disclosure, a computing platform comprising at least one processor, a communication interface, and memory storing computer-readable instructions may receive, from a user computing device, a request to access information that includes personal identifiable information (PII). The computing platform may retrieve source data comprising the PII. The computing platform may mask, within the source data and based on at least one enterprise data management policy, the PII, which may result in masked information. The computing platform may send the masked information in response to the request to access the information. The computing platform may receive a request to unmask the masked information. The computing platform may unmask the PII, which may result in unmasked PII. The computing platform may log the request to unmask the masked information in an unmasking event log, and may send the unmasked PII in response to the request to unmask the masked information. The computing platform may apply at least one machine learning model to the unmasking event log to identify one or more malicious events, and may trigger one or more remediation actions based on identification of the one or more malicious events.

In one or more instances, masking the PII may be based on one or more of: an IP address, a location, or a job title corresponding to a user of the user computing device or the user computing device. In one or more instances, the computing platform may unmask the PII by sending the corresponding source data that includes the PII.

In one or more instances, the computing platform may unmask the PII by modifying the masked information to expose the PII. In one or more instances, the computing platform may identify, based on a network policy, whether or not the request to unmask the PII should be fulfilled, and unmasking the PII may be performed in response to identifying that the request to unmask the PII should be fulfilled.

In one or more instances, triggering the one or more remediation actions may include modifying the network policy. In one or more instances, modifying the network policy may include revoking access permissions for the user computing device.

In one or more instances, the access permissions for the user computing device may be revoked for a temporary period of time. In one or more instances, identifying the one or more malicious events may include: 1) comparing the PII to information that relates to a job title of the user of the user computing device, 2) based on identifying a match between the PII and the information that relates to the job title of the user of the user computing device, verifying a non-malicious event; and 3) based on identifying that the PII does not match the information that relates to the job title of the user of the user computing device, identifying the one or more malicious events.

In one or more instances, identifying the one or more malicious events may include identifying that a number of requests for the PII by the user computing device exceeds a median number of requests for the PII by a predetermined number of standard deviations, where the requests may be initiated by other user computing devices corresponding to users associated with a particular job title and a user of the user computing device may also be associated with the particular job title.

In one or more additional or alternative embodiments, a user device comprising at least one processor, a communication interface, and memory storing computer-readable instructions may receive a request to access information that includes PII. The user device may retrieve source data comprising the PII. The user device may mask, within the source data and based on at least one enterprise data management policy, the PII, resulting in masked information. The user device may display the masked information in response to the request to access the information. The user device may receive a request to unmask the masked information and may unmask the PII, resulting in unmasked PII. The user device may display the unmasked PII in response to the request to unmask the masked information and send unmasking event information to a PII footprint modeling platform, which may cause the PII footprint modeling platform to: 1) log the request to unmask the masked information in an unmasking event log, 2) apply at least one machine learning model to the unmasking event log to identify one or more malicious events, and 3) trigger one or more remediation actions based on identification of the one or more malicious events.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for PII footprint modeling by a centralized computing platform in accordance with one or more example embodiments;

FIGS. 3A-3E depict an illustrative event sequence for PII footprint modeling by a user computing device in accordance with one or more example embodiments;

FIGS. 6-8 depict illustrative graphical user interfaces for PII footprint modeling in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe masking PII, recording PII unmasking events, and analyzing an unmasking event log to identify malicious events. For example, PII may be visible to system users who may have access to view customer and/or account information. Not all systems users may need to view the same PII for each individual system interaction. Accordingly, masking selective portions of the PII may mitigate and/or prevent nonessential exposure of sensitive information and may cause system users to click on each piece of PII to unmask it when access to such customer and/or account information is warranted. Unmasking of individual data elements by individual system users may be logged and tracked within systems and may enable the development of internal fraud risk models to detect potential attempts to compromise sensitive PII and/or other nefarious behaviors that may be indicative of malicious events.

More specifically, a risk exists that system users who have access to view customer and account information may be able to do so without a legitimate business justification and could enable malicious or otherwise deceptive events based on compromised sensitive PII. Each unmasking event may create a footprint or unique way of identifying the individual performing the action, and an event log may be created that may include an employer identifier, a date, a time, a customer identifier, an indication of what data was unmasked, and/or other information. By combining this event log information with other factors (e.g., a trailing customer claim, or other information), malicious events may be identified. In addition, system access levels may be refined by identifying what PII is typically needed to perform various job functions across an enterprise. Additionally or alternatively, PII not needed for business purposes may be permanently masked. By notifying associates that unmasking PII may be logged and used to identify/detect malicious events, such events may be deterred.

Figure 1A:
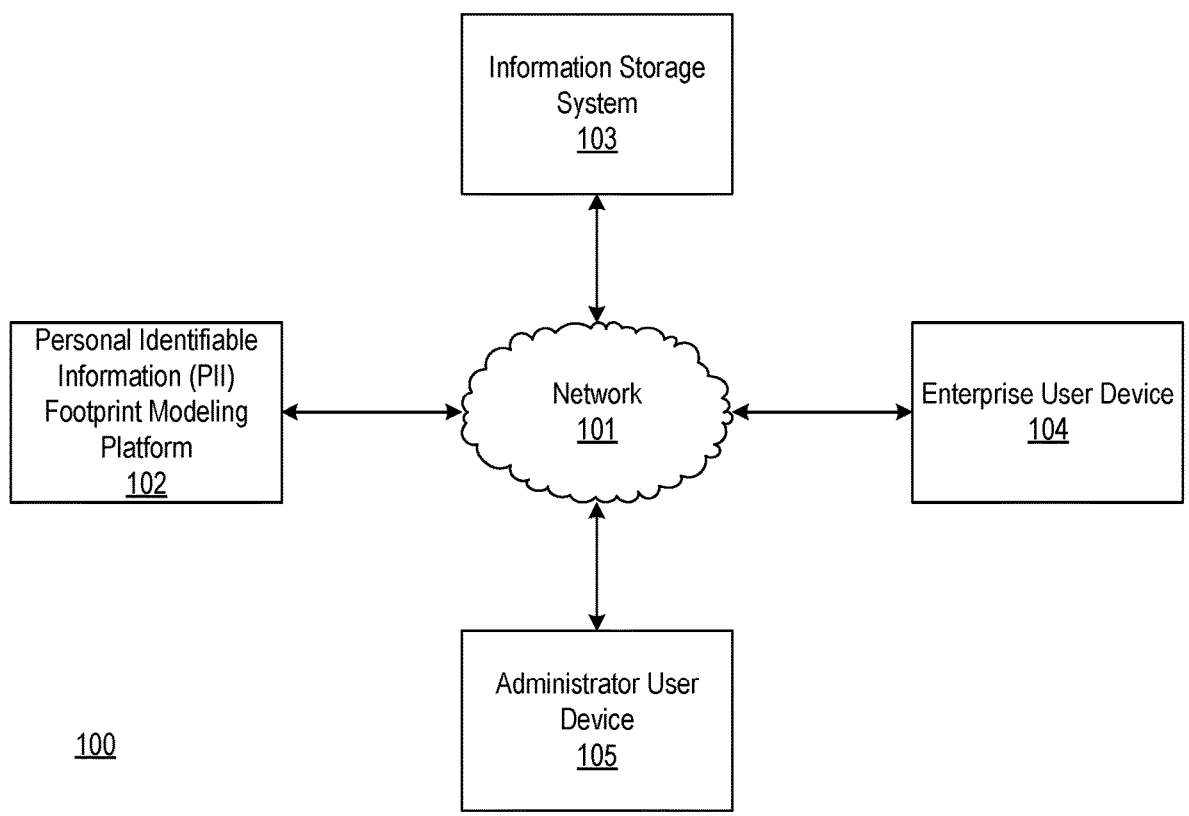
FIGS. 1A-1B depict an illustrative computing environment for PII footprint modeling in accordance with one or more example embodiments.
Figure 1B:
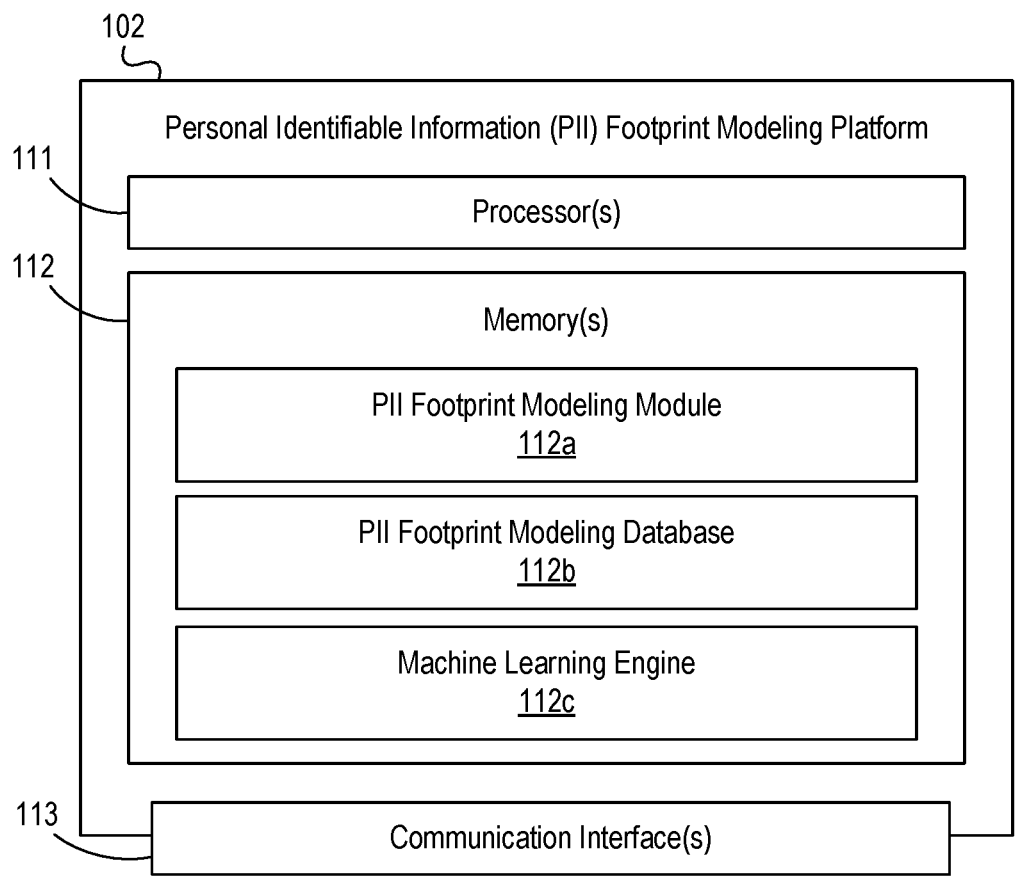

FIGS. 1A-1B depict an illustrative computing environment for PII footprint modeling in accordance with one or more example embodiments. Referring to FIG. 1A, computing environment 100 may include one or more computer systems. For example, computing environment 100 may include a PII footprint modeling platform 102, an information storage system 103, an enterprise user device 104, and an administrator user device 105.

As described further below, PII footprint modeling platform 102 may be a computer system that includes one or more computing devices (e.g., servers, server blades, or the like) and/or other computer components (e.g., processors, memories, communication interfaces) that may implement machine learning techniques to identify malicious events based on PII unmasking event information.

Information storage system 103 may include one or more computing devices (e.g., servers, server blades, or the like) and/or other computer components (e.g., processors, memories, communication interfaces) that may be used to store PII (e.g., account information, contact information, credit information, birth dates, driver's license information, expiration dates, email information, phone numbers, online banking identifiers, device identifiers, social security information, and/or other personal information) that may correspond to one or more users, accounts, and/or transactions. Although a single information storage system 103 is depicted in FIG. 1A, any number of information storage systems may be included on the network 101 without departing from the scope of the disclosure.

Enterprise user device 104 may be a laptop computer, desktop computer, mobile device, tablet, smartphone, or the like that may be used by an employee of an enterprise organization (e.g., a financial institution, or the like). For example, the enterprise user device 104 may be used by one or more individuals to perform one or more tasks, process events, and/or perform other functions. In some instances, enterprise user device 104 may be configured to display one or more user interfaces (e.g., interfaces that masked and/or made visible PII, and/or other interfaces).

Administrator user device 105 may be a laptop computer, desktop computer, mobile device, tablet, smartphone, or the like that may be used by an employee or administrator of an enterprise organization (e.g., a financial institution, or the like). For example, the administrator user device 105 may be used by one or more individuals to establish and/or enforce enterprise access permissions (e.g., defining types of PII accessible by certain individuals, departments, executives, or other employee characteristics). In some instances, administrator user device 105 may be configured to display one or more user interfaces.

Computing environment 100 also may include one or more networks, which may interconnect PII footprint modeling platform 102, information storage system 103, enterprise user device 104, and administrator user device 105. For example, computing environment 100 may include a network 101 (which may interconnect, e.g., PII footprint modeling platform 102, information storage system 103, enterprise user device 104, and/or administrator user device 105).

In one or more arrangements, PII footprint modeling platform 102, information storage system 103, enterprise user device 104, and/or administrator user device 105 may be any type of computing device capable of sending and/or receiving requests and processing the requests accordingly. For example, PII footprint modeling platform 102, information storage system 103, enterprise user device 104, administrator user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of PII footprint modeling platform 102, information storage system 103, enterprise user device 104, and/or administrator user device 105, may, in some instances, be special-purpose computing devices configured to perform specific functions.

Referring to FIG. 1B, PII footprint modeling platform 102 may include one or more processors 111, memory 112, and communication interface 113. A data bus may interconnect processor 111, memory 112, and communication interface 113. Communication interface 113 may be a network interface configured to support communication between PII footprint modeling platform 102 and one or more networks (e.g., network 101, or the like). Memory 112 may include one or more program modules having instructions that when executed by processor 111 cause PII footprint modeling platform 102 to perform one or more functions described herein and/or one or more databases that may store and/or otherwise maintain information which may be used by such program modules and/or processor 111. In some instances, the one or more program modules and/or databases may be stored by and/or maintained in different memory units of PII footprint modeling platform 102 and/or by different computing devices that may form and/or otherwise make up PII footprint modeling platform 102. For example, memory 112 may have, host, store, and/or include PII footprint modeling module 112a, PII footprint modeling database 112b, and machine learning engine 112c.

PII footprint modeling module 112a may have instructions that direct and/or cause PII footprint modeling platform 102 to execute advanced PII footprint modeling techniques. PII footprint modeling database 112b may store information used by PII footprint modeling module 112a and/or PII footprint modeling platform 102 in application of advanced machine learning techniques for PII footprint modeling, and/or in performing other functions. Machine learning engine 112c may have instructions that direct and/or cause the PII footprint modeling platform 102 to set, define, and/or iteratively refine optimization rules and/or other parameters used by the PII footprint modeling platform 102 and/or other systems in computing environment 100.

Figure 2A:
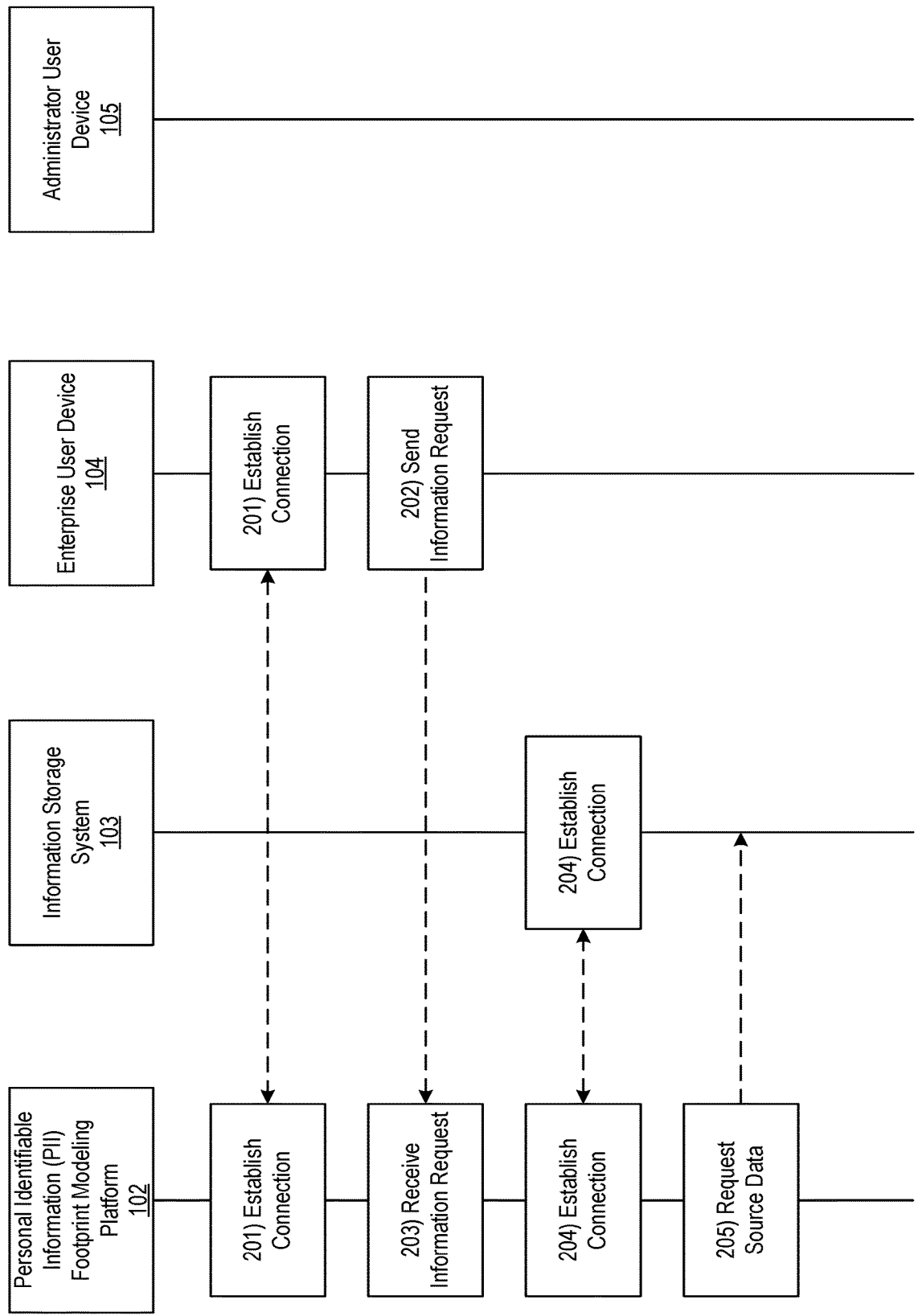

FIGS. 2A-2E depict an illustrative event sequence for PII footprint modeling by a centralized computing platform in accordance with one or more example embodiments. Referring to FIG. 2A, at step 201, enterprise user device 104 may establish a connection with the PII footprint modeling platform 102. For example, the enterprise user device 104 may establish a first wireless data connection with the PII footprint modeling platform 102 to link the enterprise user device 104 to the PII footprint modeling platform 102 (e.g., in preparation for sending a request for information). In some instances, the enterprise user device 104 may identify whether or not a connection is already established with the PII footprint modeling platform 102. If a connection is already established with the PII footprint modeling platform 102, the enterprise user device 104 might not re-establish the connection. If a connection is not yet established with the PII footprint modeling platform 102, the enterprise user device 104 may establish the first wireless data connection as described herein.

At step 202, enterprise user device 104 may send a request for information to the PII footprint modeling platform 102. For example, a user of the enterprise user device 104 (e.g., an employee of an enterprise organization such as a financial institution) may be processing a transaction, providing a service, providing information, and/or performing other functions, and may thus request information (e.g., account information, contact information, credit information, birth dates, driver's license information, expiration dates, email information, phone numbers, online banking identifiers, device identifiers, social security information, and/or other personal information) from the PII footprint modeling platform 102. In some instances, the enterprise user device 104 may send the information request to the PII footprint modeling platform 102 while the first wireless data connection is established.

At step 203, the PII footprint modeling platform 102 may receive the information request from the enterprise user device 104. For example, the PII footprint modeling platform 102 may receive the PII via the communication interface 113 and while the first wireless data connection is established.

At step 204, the PII footprint modeling platform 102 may establish a connection with the information storage system 103. For example, the PII footprint modeling platform 102 may establish a second wireless data connection with the information storage system 103 to link the PII footprint modeling platform 102 to the information storage system 103 (e.g., in preparation for requesting source data to satisfy the information request). In some instances, the PII footprint modeling platform 102 may identify whether or not a connection is already established with the information storage system 103. If the PII footprint modeling platform 102 identifies that a connection is already established with the information storage system 103, the PII footprint modeling platform 102 might not re-establish the connection. If the PII footprint modeling platform 102 identifies that a connection is not yet established with the information storage system 103, the PII footprint modeling platform 102 may establish the second wireless data connection as described herein.

At step 205, the PII footprint modeling platform 102 may request source data from the information storage system 103. For example, the PII footprint modeling platform 102 may request account information, contact information, and/or other personal information from the information storage system 103, which may, in some instances, include PII such as account information, contact information, credit information, birth dates, driver's license information, expiration dates, email information, phone numbers, online banking identifiers, device identifiers, social security information, and/or other personal information. In some instances, the PII footprint modeling platform 102 may send the source data request to the information storage system 103 via the communication interface 113 and while the second wireless data connection is established.

Figure 2B:
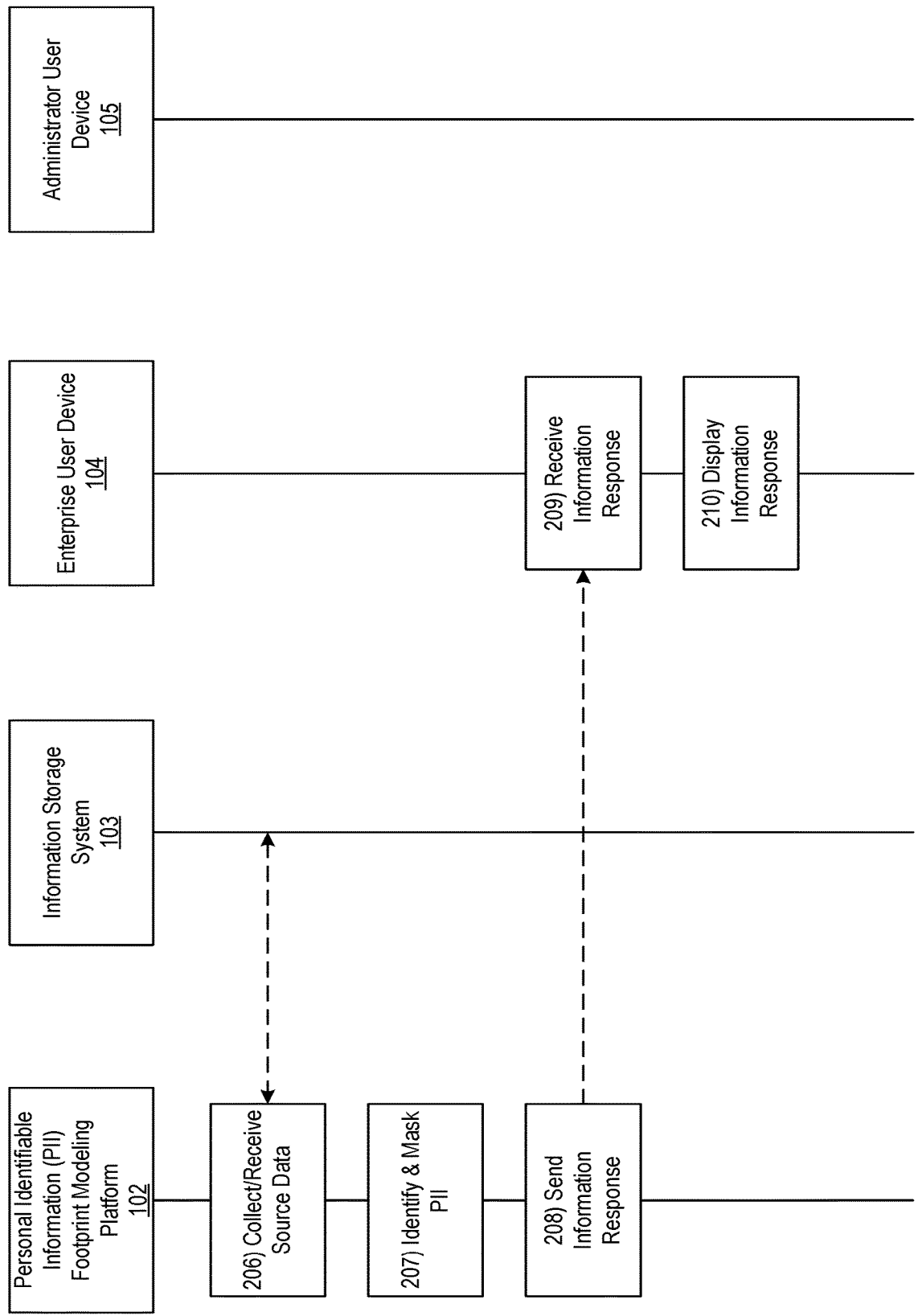

Referring to FIG. 2B, at step 206, the PII footprint modeling platform 102 may collect the source data from the information storage system 103. In some instances, in doing so, the PII footprint modeling platform 102 may collect PII that comprises the source data. For example, the PII footprint modeling platform 102 may collect the source data from the information storage system 103 while the second wireless data connection is established.

At step 207, the PII footprint modeling platform 102 may identify and mask PII collected at step 206. For example, the PII footprint modeling platform 102 may identify information that need not be exposed at the enterprise user device 104 (e.g., sensitive information such as account numbers, social security numbers, and/or other information), and may mask (e.g., conceal, scramble, obfuscate, or otherwise remove) this PII for display at the enterprise user device 104. In some instances, the PII footprint modeling platform 102 may selectively mask the PII based on the type of content that is included in the PII, such as an IP address, location, job title, department, experience level, and/or other information corresponding to a user of the enterprise user device 104 and/or the enterprise user device 104 itself (e.g., based on an established enterprise data management policy). For example, the PII footprint modeling platform 102 may identify that the user of the enterprise user device 104 and/or the enterprise user device 104 itself should not have access to the PII, and thus may mask the PII.

At step 208, the PII footprint modeling platform 102 may send an information response to the enterprise user device 104, which may include the PII in a masked form (or otherwise not include the PII). In some instances, the PII footprint modeling platform 102 may send the information response to the enterprise user device 104 via the communication interface and while the first wireless data connection is established. In some instances, along with the information response, the PII footprint modeling platform 102 may send one or more commands directing the enterprise user device 104 to display the information response.

At step 209, the enterprise user device 104 may receive the information response sent at step 208. In some instances, the enterprise user device 104 may also receive the one or more commands directing the enterprise user device 104 to display the information response. In some instances, the enterprise user device 104 may receive the information response while the first wireless data connection is established.

At step 210, based on or in response to the one or more commands directing the enterprise user device 104 to display the information response, the enterprise user device 104 may display the information response. For example, the enterprise user device 104 may display a graphical user interface similar to graphical user interface 605, which is shown in FIG. 6, and which shows certain information related to a customer, while masking other information that need not be exposed to the enterprise user.

Figure 2C:
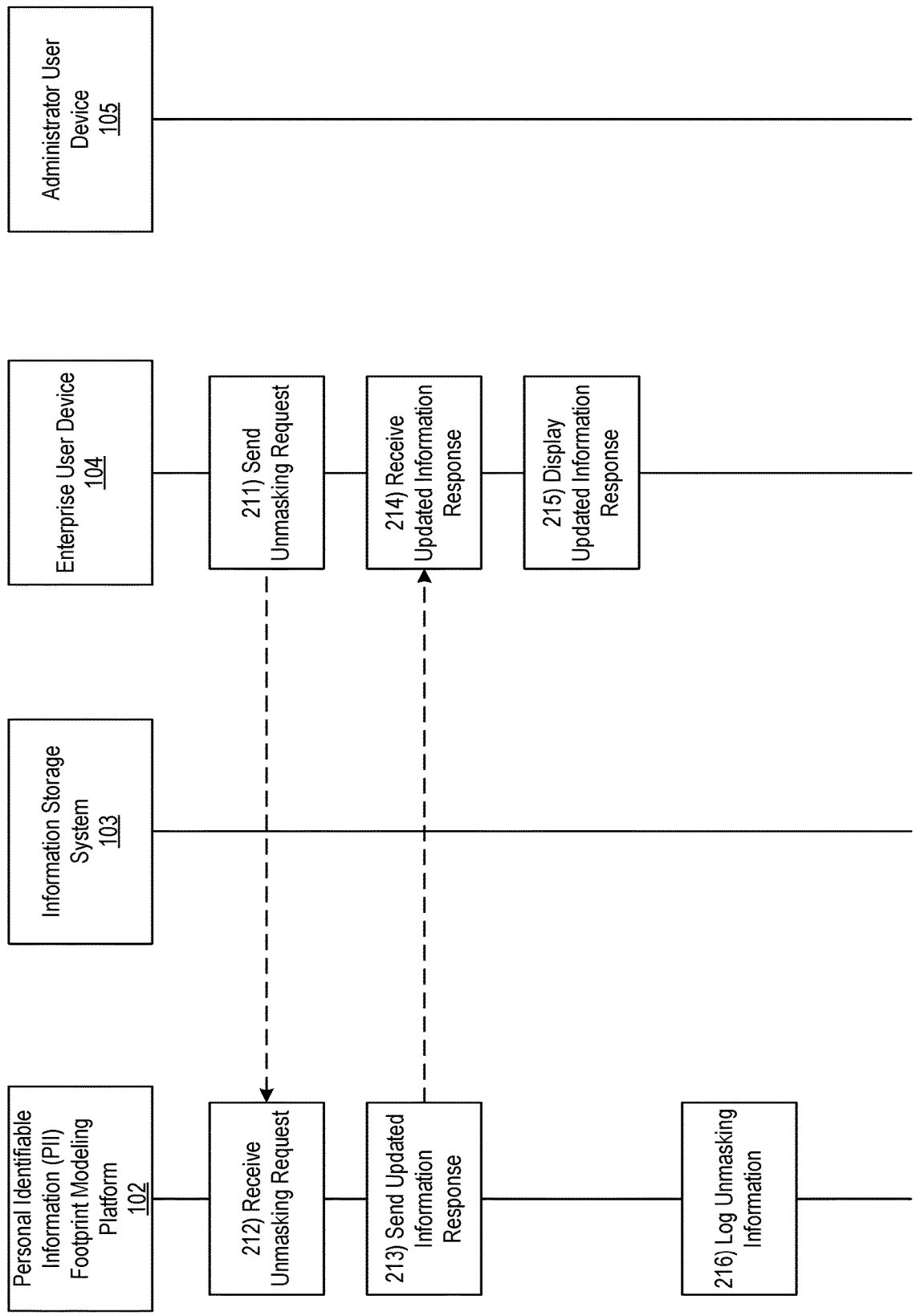

Referring to FIG. 2C, at step 211, the enterprise user device 104 may send a request to unmask masked data displayed at the enterprise user device 104. For example, the user of the enterprise user device 104 may select or otherwise indicate that access to the masked data is needed to perform a particular task or provide a particular service. In these instances, the enterprise user device 104 may send the unmasking request to the PII footprint modeling platform 102 while the first wireless data connection is established.

At step 212, the PII footprint modeling platform 102 may receive the unmasking request sent at step 211. For example, the PII footprint modeling platform 102 may receive the unmasking request via the communication interface 113 and while the first wireless data connection is established.

At step 213, the PII footprint modeling platform 102 may send an updated information response to the enterprise user device 104 in which the PII, related to the unmasking request, is unmasked. For example, the PII footprint modeling platform 102 may unmask the PII by sending the corresponding source data (e.g., received at step 206), which might previously not have been sent in the information response at step 208. Additionally or alternatively, the PII footprint modeling platform 102 may unmask the PII by modifying the masked information, included in the information response sent at step 208, to expose the PII. In some instances, the PII footprint modeling platform 102 may unmask a portion of the PII without exposing all of the masked PII.

In some instances, the PII footprint modeling platform 102 may identify based on the enterprise data management policy, whether or not to unmask the PII. If the PII footprint modeling platform 102 identifies that the user of the enterprise user device 104 or the enterprise user device 104 itself is not authorized to access the PII (based on the enterprise data management policy), the PII footprint modeling platform 102 might not unmask the PII, whereas the PII footprint modeling platform 102 may unmask the PII in response to identifying that the user of the enterprise user device is authorized to access the PII.

In some instances, the PII footprint modeling platform 102 may send the updated information response to the enterprise user device 104 via the communication interface and while the first wireless data connection is established. In some instances, the PII footprint modeling platform 102 may also send one or more commands directing the enterprise user device 104 to display the updated information response.

At step 214, the enterprise user device 104 may receive the updated information response sent at step 213. In some instances, the enterprise user device 104 may receive the updated information response while the first wireless data connection is established. In some instances, the enterprise user device 104 may also receive the one or more commands directing the enterprise user device 104 to display the updated information response.

At step 215, based on or in response to the one or more commands directing the enterprise user device 104 to display the updated information response, the enterprise user device 104 may display the updated information response. For example, the enterprise user device 104 may display a graphical user interface similar to graphical user interface 705, which is shown in FIG. 7, and which exposes the PII previously masked (e.g., as shown in the graphical user interface 605).

At step 216, the PII footprint modeling platform 102 may log information corresponding to the unmasking request. For example, the PII footprint modeling platform 102 may log and/or otherwise record a device identifier of the enterprise user device 104, a user identifier of the user of the enterprise user device 104 (e.g., an employee identifier), a customer identifier, a date, a time, the PII for which unmasking was requested, geolocation information, IP addresses, whether the enterprise user device 104 is operating on a physical or remote connection, an identifier corresponding to the information storage system 103, and/or other information. In doing so, the PII footprint modeling platform 102 may establish a PII event log that may be subsequently analyzed to identify insights and/or malicious events (as described further below).

Figure 2D:
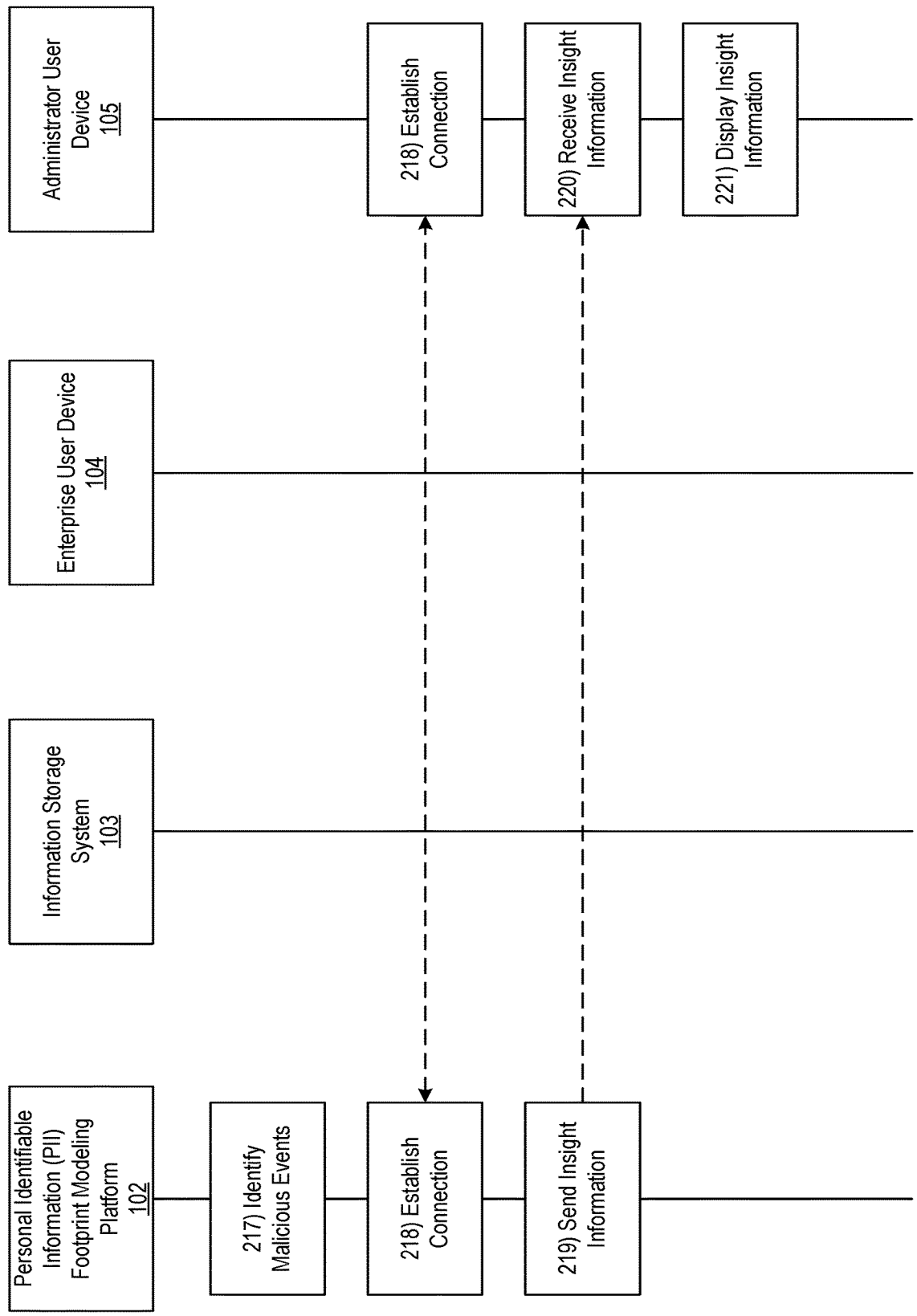

Referring to FIG. 2D, at step 217, the PII footprint modeling platform 102 may input the PII event log into a machine learning model to identify potential malicious events. For example, the PII footprint modeling platform 102 may identify whether or not information corresponding to the unmasking request indicates that the unmasking request is an outlier and/or unusual request. For example, the PII footprint modeling platform 102 may maintain a listing of PII that may relate to services and/or functions provided by various employees based on job roles, departments, experience levels, geographic regions, and/or other employee characteristics. In these instances, the PII footprint modeling platform 102 may compare the requested PII to the list of related PII to identify whether or not the requested PII relates to the services and/or functions provided by the user of the enterprise user device 104. If the PII footprint modeling platform 102 identifies that the requested PII does not relate to the services and/or functions of the enterprise user device 104, the PII footprint modeling platform 102 may flag the unmasking request as a potentially malicious event. For example, if a request to unmask a social security number is received, and social security numbers have no relation to the functions of the user of the enterprise user device 104, a malicious event may be detected. If the PII footprint modeling platform 102 identifies that the requested PII does relate to the services and/or functions of the enterprise user device 104, the PII footprint modeling platform 102 may, in some instances, further analyze the PII event log (e.g., as described below).

For example, the PII footprint modeling platform 102 may identify a frequency with which employees with various job titles, experience levels, departments, and/or other characteristics access the PII for which unmasking was requested. For example, the PII footprint modeling platform 102 may identify, using the PII event log, a number of times that the enterprise user device 104 (and/or a user of the enterprise user device 104) has requested unmasking of the PII within a predetermined period (e.g., a day, week, month, or other time period). In this example, the PII footprint modeling platform 102 may compare this number of unmasking requests to unmasking requests received for the PII from other enterprise user devices and/or employees. In doing so, the PII footprint modeling platform 102 may identify whether the enterprise user device 104 is requesting the PII within one or more standard deviations of a median or mean number of unmasking requests received from similarly situated employees (e.g., similar job title, department, experience level, geographic region and/or other characteristics). For example, the PII footprint modeling platform 102 may identify that the enterprise user device 104 has requested unmasking of social security numbers 500 times within the last 24 hours, whereas other similarly situated employees have only requested 5 social security numbers within the last week. If the enterprise user device 104 identifies that the number of unmasking requests for the PII received from the enterprise user device 104 falls outside of a first standard deviation of a median or mean number of unmasking requests for the PII, the PII footprint modeling platform 102 may identify a malicious event. For example, the PII footprint modeling platform 102 may apply the following model: if $$\sqrt{\frac{\sum(x_i - \mu)^2}{N}} > 1,$$

then malicious event and if $$\sqrt{\frac{\sum(x_i - \mu)^2}{N}} \leq 1,$$

no malicious event. In these instances, N may represent a number of employees (e.g., similarly situated employees), $\mu$ may represent an average number of attempts (e.g., by the similarly situated employees) to access a particular type of PII, and $x_i$ may represent the number of attempts to access the particular type of PII by the user of the enterprise user device 104. In these instances, the values of $\mu$ corresponding to various types of PII may be established based on the PII event log, which may include a record of requests to unmask various types of PII by various employees.

Additionally or alternatively, the PII footprint modeling platform 102 may compare the requested PII to a service being performed to identify whether or not a malicious event occurred. For example, if the enterprise user device 104 is performing a balance inquiry, unmasking of driver's license information might not be necessary. Thus, an attempt to unmask the driver's license information in this context may indicate a malicious event. As a result, the PII footprint modeling platform 102 may generate insight information indicating whether or not the unmasking request corresponds to a malicious event.

At step 218, the PII footprint modeling platform 102 may establish a connection with the administrator user device 105. For example, the PII footprint modeling platform 102 may establish a third wireless data connection to link the PII footprint modeling platform 102 to the administrator user device 105 (e.g., in preparation for sending insight information). In some instances, the PII footprint modeling platform 102 may identify whether or not a connection is already established with the administrator user device 105. If a connection is already established with the administrator user device 105, the PII footprint modeling platform 102 might not re-establish the connection. If a connection is not yet established with the administrator user device 105, the PII footprint modeling platform 102 may establish the third wireless data connection as described herein.

At step 219, the PII footprint modeling platform 102 may send the insight information to the administrator user device 105. For example, the PII footprint modeling platform 102 may send the insight information to the administrator user device 105 via the communication interface 113 and while the third wireless data connection is established. In some instances, the PII footprint modeling platform 102 may also send one or more commands directing the administrator user device 105 to display the insight information.

At step 220, the administrator user device 105 may receive the insight information sent at step 219. For example, the administrator user device 105 may receive the insight information while the third wireless data connection is established. In some instances, the administrator user device 105 may also receive the one or more commands directing the administrator user device 105 to display the insight information.

Figure 8:
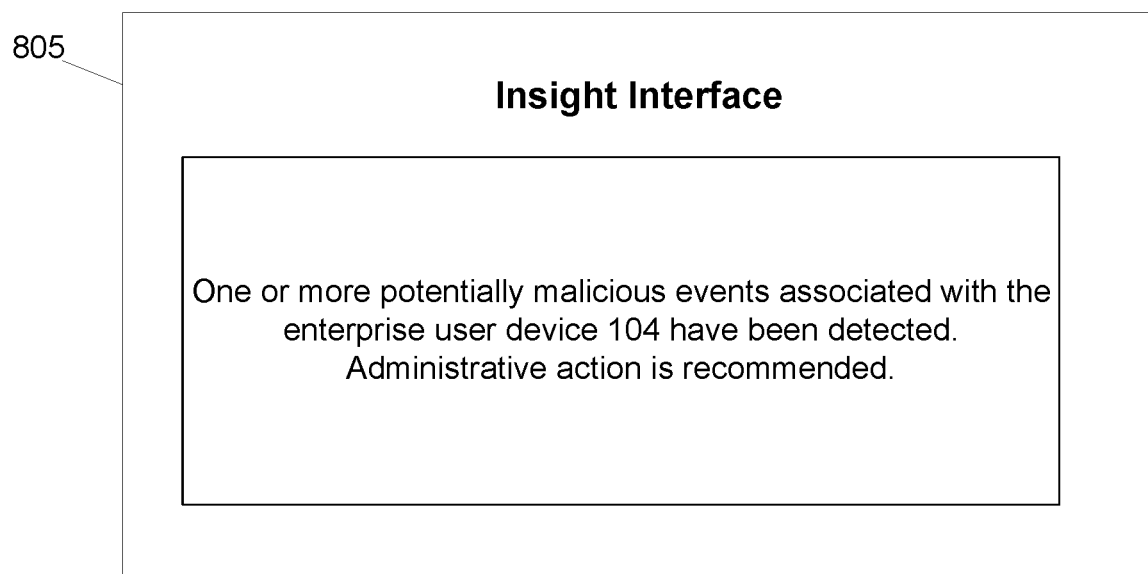

At step 221, based on or in response to the one or more commands directing the administrator user device 105 to display the insight information, the administrator user device 105 may display the insight information. For example, the administrator user device 105 may display a graphical user interface similar to graphical user interface 805, which is shown in FIG. 8, and which indicates that a potential malicious event has been detected.

Referring to FIG. 2E, at step 222, the PII footprint modeling platform 102 may generate one or more remediation actions. For example, the PII footprint modeling platform 102 may identify an enterprise data management policy update (e.g., indicating that access permissions for the enterprise user device 104 and/or the user of the enterprise user device 104 should be revoked, temporarily suspended, and/or otherwise modified). In some instances, the one or more remediation actions may be generated based on the standard deviation identified at step 217. For example, if the standard deviation is identified between 1 and 2, the PII footprint modeling platform 102 may temporarily suspend network access to the enterprise user device 104, whereas if the standard deviation is identified to be 2 or more, an enterprise data management policy may be modified so as to permanently prevent the enterprise user device 104 from accessing the PII and/or permanently suspend network access.

At step 223, the PII footprint modeling platform 102 may implement the one or more remediation actions. For example, the PII footprint modeling platform 102 may update the enterprise data management policy based on the identified enterprise data management policy update. By performing such remediation actions, in addition or as an alternative to identifying malicious events on the fly, the PII footprint modeling platform 102 may prevent malicious events before they occur. For example, once the enterprise user device 104 has been flagged as attempting to perform malicious events, network access may be revoked for that device in anticipation of future attempts to perform malicious events. Additionally or alternatively, retroactive identification may be performed by the PII footprint modeling platform 102 to identify other PII that has been previously accessed by the enterprise user device 104 (and thus may be compromised). In these instances, the PII footprint modeling platform 102 may notify customers corresponding to the retroactively identified PII of a potential malicious event and/or that the corresponding PII may be compromised.

Figure 3A:
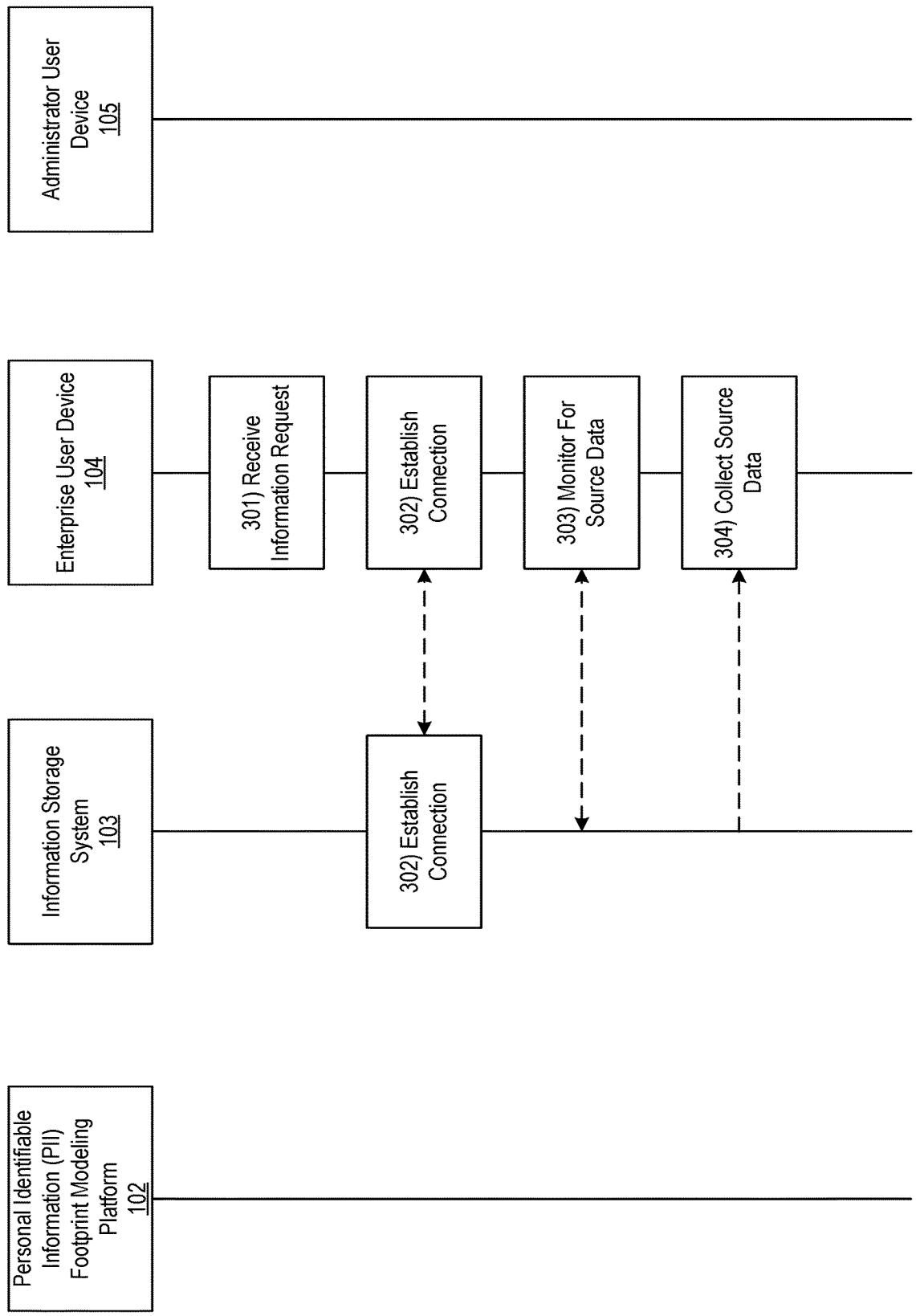

FIGS. 3A-3E depict an illustrative event sequence for PII footprint modeling by a user device in accordance with one or more example embodiments. In some instances, the event sequence depicted in FIGS. 3A-3E may be performed in addition or as an alternative to the event sequence described in FIGS. 2A-2E. For example, in some instances, the PII footprint modeling platform 102 may cause a plug-in or other software to be installed at the enterprise user device 104 which may enable the enterprise user device 104 to perform one or more of the functions, described above with regard to FIGS. 2A-2E, otherwise performed by the PII footprint modeling platform 102. As a result of the plug-in or other software, the enterprise user device 104 may perform one or more of the functions described below. Referring to FIG. 3A, at step 301, enterprise user device 104 may receive a request for information (e.g., similar to the request received by the PII footprint modeling platform 102 at step 203). For example, a user of the enterprise user device 104 (e.g., an employee of an enterprise organization such as a financial institution) may be processing a transaction, providing a service, providing information, and/or performing other functions, and may thus request information (e.g., account information, contact information, credit information, birth dates, driver's license information, expiration dates, email information, phone numbers, online banking identifiers, device identifiers, social security information, and/or other personal information) from the enterprise user device 104.

At step 302, enterprise user device 104 may establish a connection with the information storage system 103. For example, the enterprise user device 104 may establish a first wireless data connection with the information storage system 103 to link the enterprise user device 104 to the information storage system 103 (e.g., in preparation for collecting source data). In some instances, the enterprise user device 104 may identify whether or not a connection is already established with the information storage system 103. If a connection is already established with the information storage system 103, the enterprise user device 104 might not re-establish the connection. If a connection is not yet established with the information storage system 103, the enterprise user device 104 may establish the first wireless data connection as described herein.

At step 303, the enterprise user device 104 may monitor the information storage system 103 for source data corresponding to the information request. For example, the enterprise user device 104 may request account information, contact information, and/or other personal information from the information storage system 103, which may, in some instances, include PII such as account information, contact information, credit information, birth dates, driver's license information, expiration dates, email information, phone numbers, online banking identifiers, device identifiers, social security information, and/or other personal information. In some instances, the enterprise user device 104 may request the source data while the first wireless data connection is established. In some instances, actions performed by the enterprise user device 104 at step 303 may be similar to the actions performed by the PII footprint modeling platform 102 at step 205.

At step 304, the enterprise user device 104 may collect the source data from the information storage system 103. In some instances, in doing so, the enterprise user device 104 may collect PII that comprises the source data. For example, the enterprise user device 104 may collect the source data from the information storage system 103 while the first wireless data connection is established. In some instances, actions performed by the enterprise user device 104 at step 304 may be similar to the actions performed by the PII footprint modeling platform 102 at step 206.

Figure 3B:
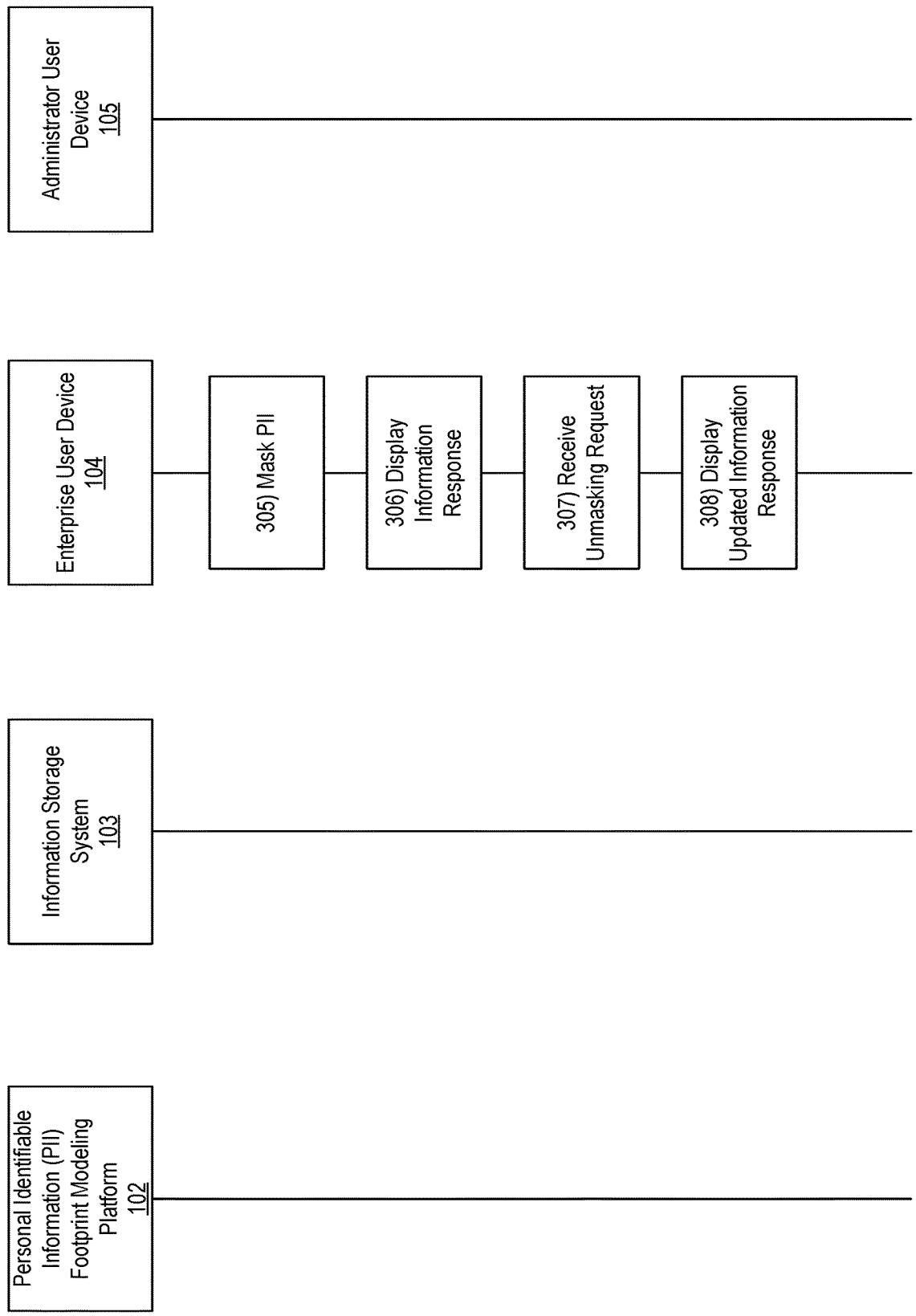

Referring to FIG. 3B, at step 305, the enterprise user device 104 may identify and mask PII collected at step 304. For example, the enterprise user device 104 may identify information that need not be exposed (e.g., sensitive information such as account numbers, social security numbers, and/or other information), and may mask (e.g., conceal, scramble, obfuscate, or otherwise remove) this PII for display. In some instances, the enterprise user device 104 may mask the PII based on the type of content that is included in the PII, such as an IP address, location, job title, department, experience level, and/or other information corresponding to a user of the enterprise user device 104 and/or the enterprise user device 104 itself (e.g., based on an established enterprise data management policy). For example, the enterprise user device 104 may identify that the user of the enterprise user device 104 and/or the enterprise user device 104 itself should not have access to the PII, and thus may mask the PII. In some instances, actions performed by the enterprise user device 104 at step 305 may be similar to those performed by the PII footprint modeling platform 102 at step 207.

At step 306, the enterprise user device 104 may generate an information response, which may include the PII in a masked form (or otherwise not include the PII). In some instances, the enterprise user device 104 may display the information response. For example, the enterprise user device 104 may display a graphical user interface similar to graphical user interface 605, which is shown in FIG. 6, and which shows certain information related to a customer, while masking other information that need not be exposed to the enterprise user. In some instances, actions performed at step 306 may be similar to those described above with regard to steps 208-210.

At step 307, the enterprise user device 104 may receive a request to unmask masked data displayed at the enterprise user device 104. For example, the user of the enterprise user device 104 may select or otherwise indicate that access to the masked data is needed to perform a particular task or provide a particular service. In some instances, actions performed at step 306 may be similar to those performed by the PII footprint modeling platform 102 at steps 211-212.

At step 308, the enterprise user device 104 may generate an updated information response in which the PII, related to the unmasking request, is unmasked. For example, the enterprise user device 104 may unmask the PII by sending the corresponding source data (e.g., received at step 304), which might previously not have been displayed at step 306. Additionally or alternatively, the enterprise user device 104 may unmask the PII by modifying the masked information, included in the information displayed at step 306, to expose the PII. In some instances, the enterprise user device 104 may unmask a portion of the PII without exposing all of the masked PII.

In some instances, the enterprise user device 104 may identify, based on the enterprise data management policy, whether or not to unmask the PII. If the enterprise user device 104 identifies that the user of the enterprise user device 104 or the enterprise user device 104 itself is not authorized to access the PII (e.g., based on the enterprise data management policy), the enterprise user device 104 might not unmask the PII, whereas the enterprise user device 104 may unmask the PII in response to identifying that the user of the enterprise user device is authorized to access the PII.

If the PII is to be unmasked, the enterprise user device 104 may display the updated information response. For example, the enterprise user device 104 may display a graphical user interface similar to graphical user interface 705, which is shown in FIG. 7, and which exposes the PII previously masked (e.g., as shown in the graphical user interface 605). In some instances, actions performed by the enterprise user device 104 at step 307 may be similar to those performed at steps 213-215.

Figure 3C:
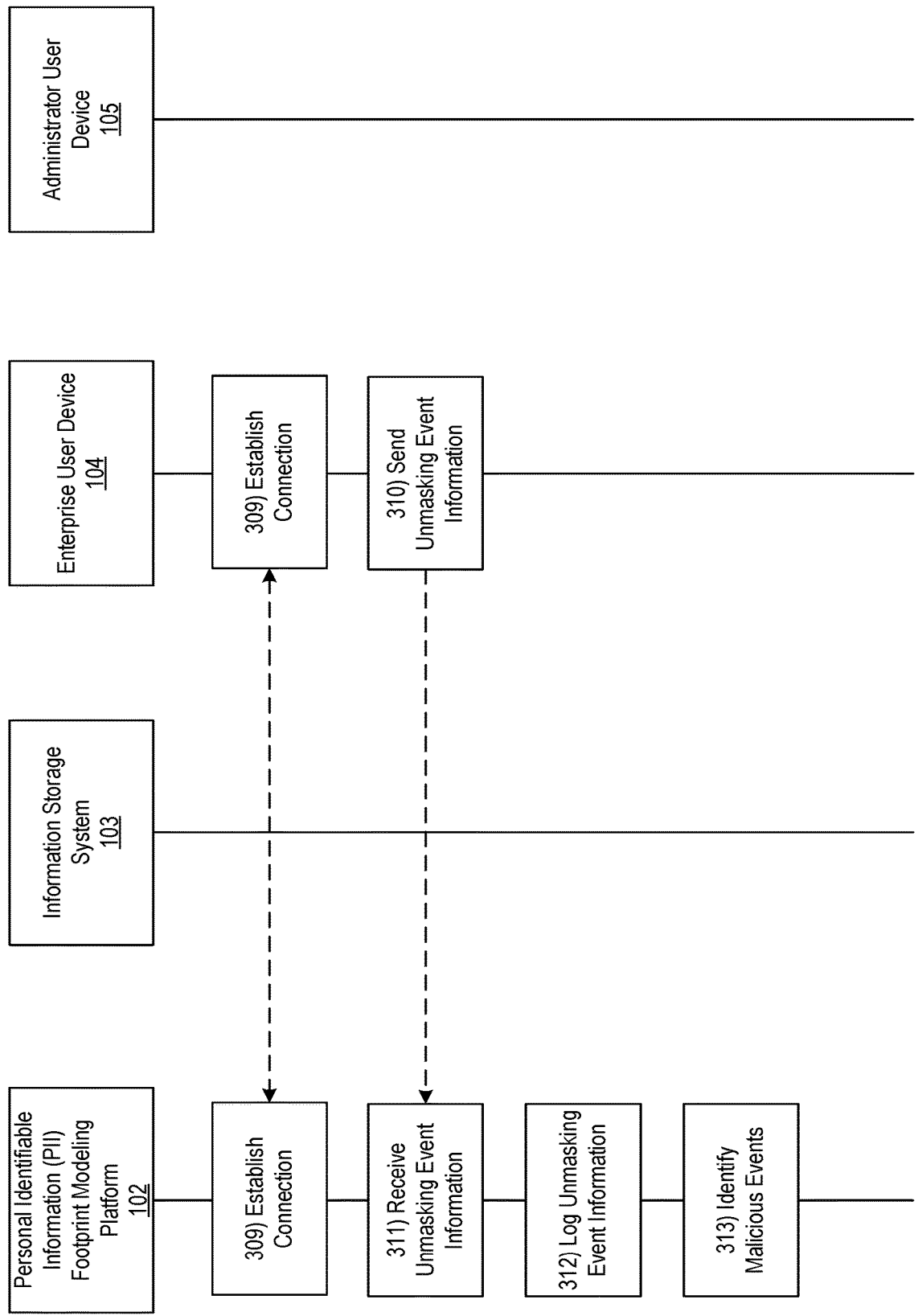

Referring to FIG. 3C, at step 309, the enterprise user device 104 may establish a connection with the PII footprint modeling platform 102. For example, the enterprise user device 104 may establish a second wireless data connection with the PII footprint modeling platform 102 to link the enterprise user device 104 to the PII footprint modeling platform 102 (e.g., in preparation for sending unmasking event information). In some instances, the enterprise user device 104 may identify whether a connection is already established with the PII footprint modeling platform 102. If a connection is already established with the PII footprint modeling platform 102, the enterprise user device 104 might not re-establish the connection. If a connection is not yet established with the PII footprint modeling platform 102, the enterprise user device 104 may establish a second wireless data connection as described herein.

At step 310, the enterprise user device 104 may send unmasking event information, corresponding to the unmasking request, to the PII footprint modeling platform 102. For example, the enterprise user device 104 may send a device identifier of the enterprise user device 104, a user identifier of the user of the enterprise user device 104 (e.g., an employee identifier), a customer identifier, a date, a time, the PII for which unmasking was requested, geolocation information, IP addresses, whether the enterprise user device 104 is operating on a physical or remote connection, an identifier corresponding to the information storage system 103, and/or other information. In some instances, the enterprise user device 104 may send the unmasking event information to the PII footprint modeling platform 102 while the second wireless data connection is established.

At step 311, the PII footprint modeling platform 102 may receive the unmasking event information sent at step 310. For example, the PII footprint modeling platform 102 may receive the unmasking event information via the communication interface 113 and while the second wireless data connection is established.

At step 312, the PII footprint modeling platform 102 may log the unmasking event information received at step 311. For example, the PII footprint modeling platform 102 may log a device identifier of the enterprise user device 104, a user identifier of the user of the enterprise user device 104 (e.g., an employee identifier), a customer identifier, a date, a time, the PII for which unmasking was requested, geolocation information, IP addresses, whether the enterprise user device 104 is operating on a physical or remote connection, an identifier corresponding to the information storage system 103, and/or other information. In doing so, the PII footprint modeling platform 102 may establish a PII event log that may subsequently be analyzed to identify insights and/or malicious events. Actions performed at steps 310-312 may be similar to those described above with regard to step 216.

At step 313, the PII footprint modeling platform 102 may input the PII event log into a machine learning model to identify potential malicious events. For example, the PII footprint modeling platform 102 may identify whether or not information corresponding to the unmasking request indicates that the unmasking request is an outlier and/or unusual request. For example, the PII footprint modeling platform 102 may maintain a listing of PII that may relate to services and/or functions provided by various employees based on job roles, departments, experience levels, geographic region, and/or other employee characteristics. In these instances, the PII footprint modeling platform 102 may compare the requested PII to the list of related PII to identify whether or not the requested PII relates to the services and/or functions provided by the user of the enterprise user device 104. If the PII footprint modeling platform 102 identifies that the requested PII does not relate to the services and/or functions of the enterprise user device 104, the PII footprint modeling platform 102 may flag the unmasking request as a potentially malicious event. For example, if a request to unmask a social security number is received, and social security numbers have no relation to the functions of the user of the enterprise user device 104, a malicious event may be detected. If the PII footprint modeling platform 102 identifies that the requested PII does relate to the services and/or functions of the enterprise user device 104, the PII footprint modeling platform 102 may further analyze the PII event log (e.g., as described below).

For example, the PII footprint modeling platform 102 may identify a frequency with which employees with various job titles, experience levels, departments, and/or other characteristics access the PII for which unmasking was requested. For example, the PII footprint modeling platform 102 may identify, using the PII event log, a number of times that the enterprise user device 104 (and/or a user of the enterprise user device 104) has requested unmasking of the PII within a predetermined period (e.g., a day, week, month, or other time period). In this example, the PII footprint modeling platform 102 may compare this number of unmasking requests to unmasking requests received for the PII from other enterprise user devices and/or employees. In doing so, the PII footprint modeling platform 102 may identify whether the enterprise user device 104 is requesting the PII within one or more standard deviations of a median or mean number of unmasking requests received from similarly situated employees (e.g., similar job title, department, experience level, geographic region and/or other characteristics). For example, the PII footprint modeling platform 102 may identify that the enterprise user device 104 has requested unmasking of social security numbers 500 times within the last 24 hours, whereas other similarly situated employees have only requested 5 social security numbers within the last week. If the enterprise user device 104 identifies that the number of unmasking requests for the PII received from the enterprise user device 104 falls outside of a first standard deviation of a median or mean number of unmasking requests for the PII, the PII footprint modeling platform 102 may identify a malicious event. For example, the PII footprint modeling platform 102 may apply the following model: if $$\sqrt{\frac{\sum (x_i - \mu)^2}{N}} > 1,$$

then malicious event and if $$\sqrt{\frac{\sum (x_i - \mu)^2}{N}} \leq 1,$$

no malicious event. In these instances, N may represent a number of employees (e.g., similarly situated employees), $\mu$ may represent an average number of attempts (e.g., by the similarly situated employees) to access a particular type of PII, and $x_i$ may represent the number of attempts to access the particular type of PII by the user of the enterprise user device 104. In these instances, the values of $\mu$ corresponding to various types of PII may be established based on the PII event log, which may include a record of requests to unmask various types of PII by various employees.

Additionally or alternatively, the PII footprint modeling platform 102 may compare the requested PII to a service being performed to identify whether or not a malicious event occurred. For example, if the enterprise user device 104 is performing a balance inquiry, unmasking of driver's license information might not be necessary. Thus, an attempt to unmask the driver's license information in this context may indicate a malicious event. As a result, the PII footprint modeling platform 102 may generate insight information indicating whether or not the unmasking request corresponds to a malicious event. Actions performed at step 313 may be similar to those described above with regard to step 217.

Figure 3D:
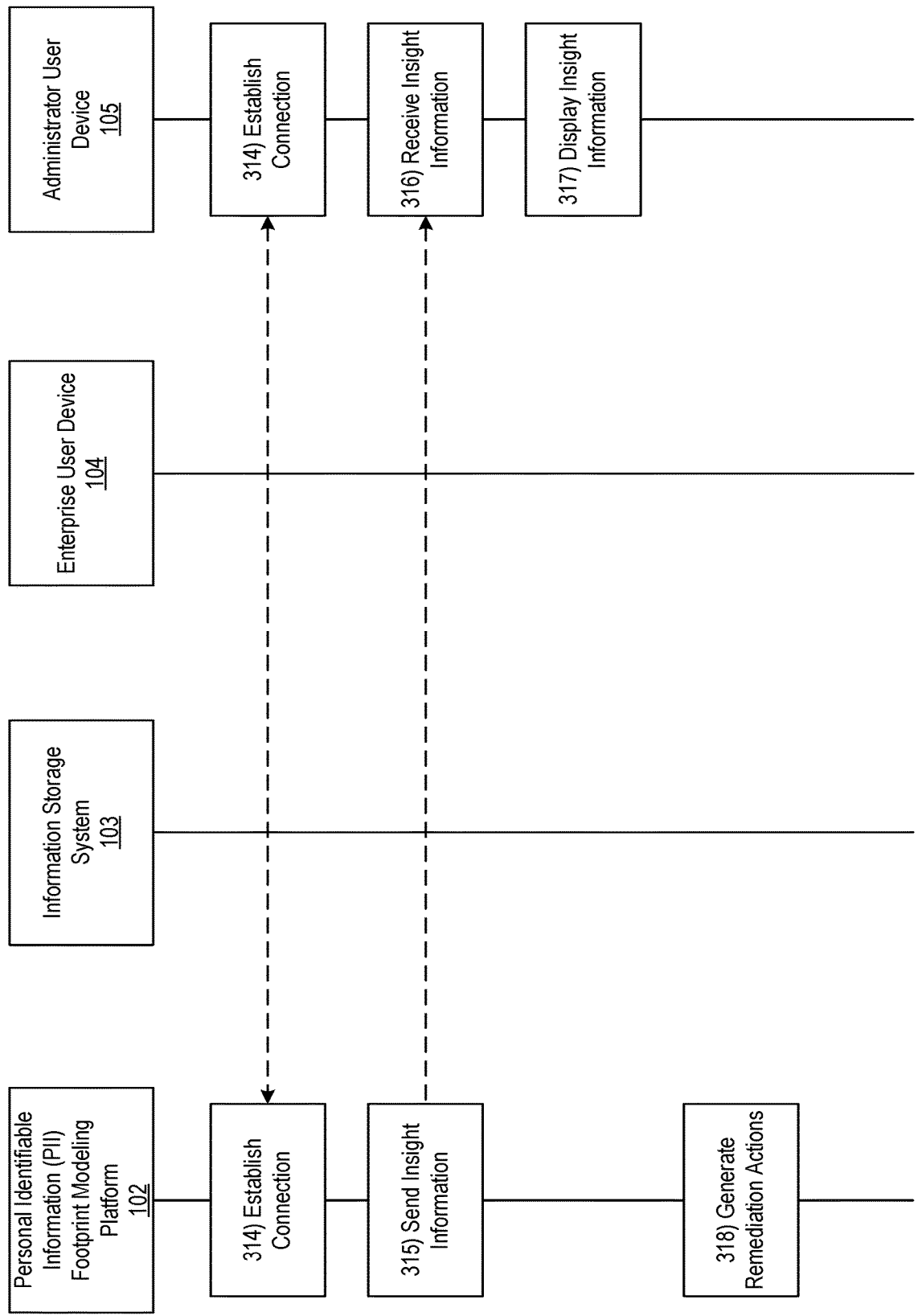

Referring to FIG. 3D, at step 314, the PII footprint modeling platform 102 may establish a connection with administrator user device 105. For example, the PII footprint modeling platform 102 may establish a third wireless data connection with the administrator user device 105 (e.g., in preparation for sending insight information to the administrator user device 105). In some instances, the PII footprint modeling platform 102 may identify whether or not a connection is already established with the administrator user device 105. If a connection is already established with the administrator user device 105, the PII footprint modeling platform 102 might not re-establish the connection. If a connection is not yet established with the administrator user device 105, the PII footprint modeling platform 102 may establish the third wireless data connection as described herein.

At step 315, the PII footprint modeling platform 102 may send the insight information to the administrator user device 105. For example, the PII footprint modeling platform 102 may send the insight information to the administrator user device 105 via the communication interface 113 and while the third wireless data connection is established. In some instances, the PII footprint modeling platform 102 may also send one or more commands directing the administrator user device 105 to display the insight information. Actions performed at step 315 may be similar to those described above with regard to step 219.

At step 316, the administrator user device 105 may receive the insight information sent at step 315. For example, the administrator user device 105 may receive the insight information while the third wireless data connection is established. In some instances, the administrator user device 105 may also receive the one or more commands directing the administrator user device 105 to display the insight information. Actions performed at step 316 may be similar to those described above with regard to step 220.

At step 317, based on or in response to the one or more commands directing the administrator user device 105 to display the insight information, the administrator user device 105 may display the insight information. For example, the administrator user device 105 may display a graphical user interface similar to graphical user interface 805, which is shown in FIG. 8, and which indicates that a potential malicious event has been detected. Actions performed at step 317 may be similar to those described above with regard to step 221.

At step 318, the PII footprint modeling platform 102 may generate one or more remediation actions. For example, the PII footprint modeling platform 102 may identify an enterprise data management policy update (e.g., indicating that access permissions for the enterprise user device 104 and/or the user of the enterprise user device 104 should be revoked, temporarily suspended, and/or otherwise modified). In some instances, the one or more remediation actions may be generated based on the standard deviation identified at step 313. For example, if the standard deviation is identified between 1 and 2, the PII footprint modeling platform 102 may temporarily suspend network access to the enterprise user device 104, whereas if the standard deviation is identified to be 2 or more, an enterprise data management policy may be modified so as to permanently prevent the enterprise user device 104 from accessing the PII and/or permanently suspend network access. Actions performed at step 318 may be similar to those described above with regard to step 222.

Referring to FIG. 3E, at step 319, the PII footprint modeling platform 102 may implement the one or more remediation actions. For example, the PII footprint modeling platform 102 may update the enterprise data management policy based on the identified enterprise data management policy update. By performing such remediation actions, in addition or as an alternative to identifying malicious events on the fly, the PII footprint modeling platform 102 may prevent malicious events before they occur. For example, once the enterprise user device 104 has been flagged as attempting to perform malicious events, network access may be revoked for that device in anticipation of future attempts to perform malicious events. Additionally or alternatively, retroactive identification may be performed by the PII footprint modeling platform 102 to identify other PII that has been previously accessed by the enterprise user device 104 (and thus may be compromised). Actions performed at step 319 may be similar to those described above with regard to step 223.

Figure 4:
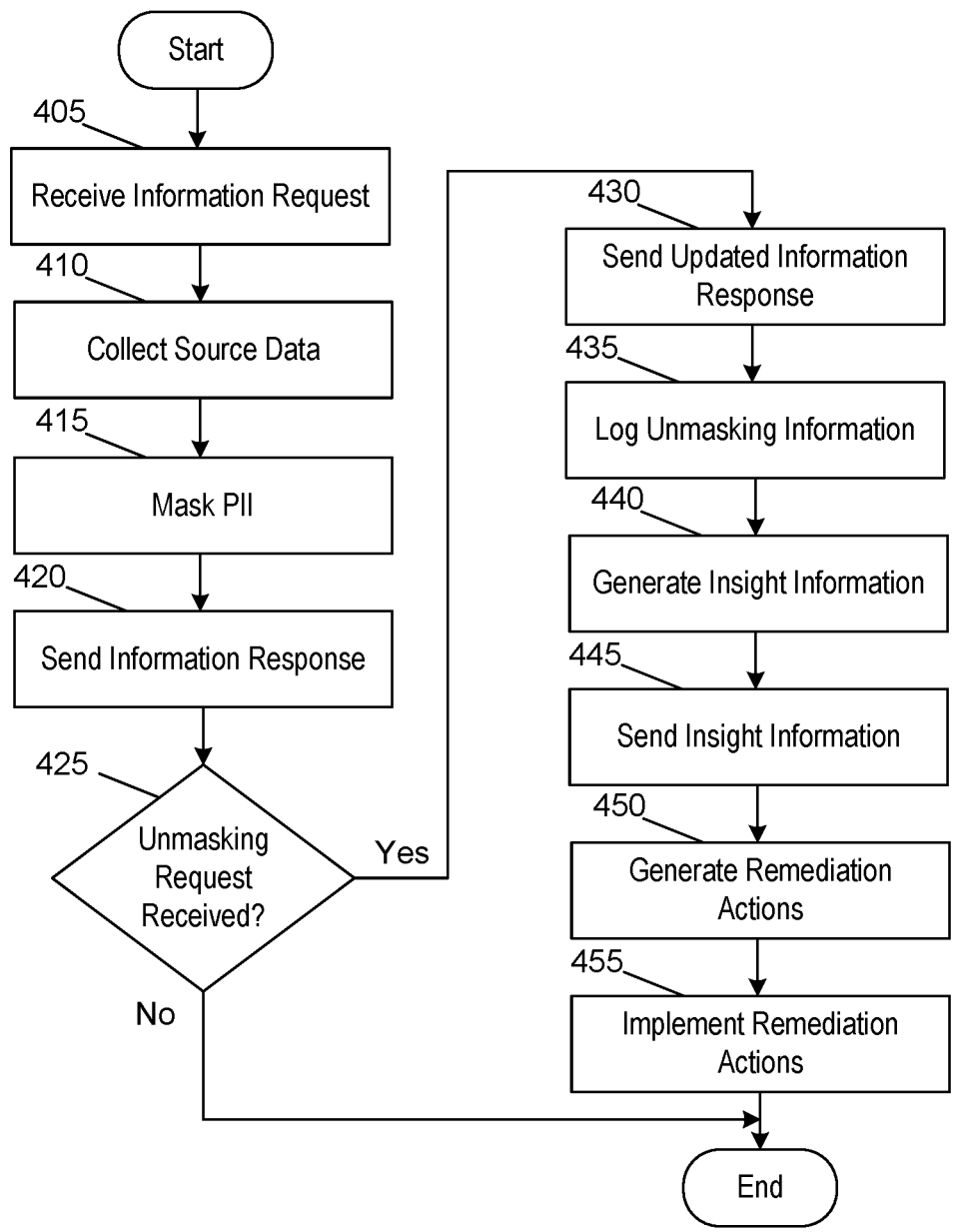
FIG. 4 depicts an illustrative method for PII footprint modeling by a centralized computing platform in accordance with one or more example embodiments.

FIG. 4 depicts an illustrative method for PII footprint modeling by a centralized computing platform in accordance with one or more example embodiments. Referring to FIG. 4, at step 405, a computing platform having at least one processor, a communication interface, and memory may receive an information request. At step 410, the computing platform may collect source data to respond to the information request. At step 415, the computing platform may mask PII included in the source data. At step 420, the computing platform may send an information request in which the PII is masked. At step 425, the computing platform may identify whether or not an unmasking request is received. If an unmasking request is not received, the method may end. If an unmasking request is received, the computing platform may proceed to step 430.

At step 430, the computing platform may send an updated information response in which the PII is now exposed. At step 435, the computing platform may log unmasking information. At step 440, the computing platform may generate insight information using a machine learning model and based on logged unmasking information. At step 445, the computing platform may send insight information to an administrator user device 105 for display. At step 450, the computing platform may generate one or more remediation actions based on the insight information. At step 455, the computing platform may implement the one or more remediation actions.

Figure 5:
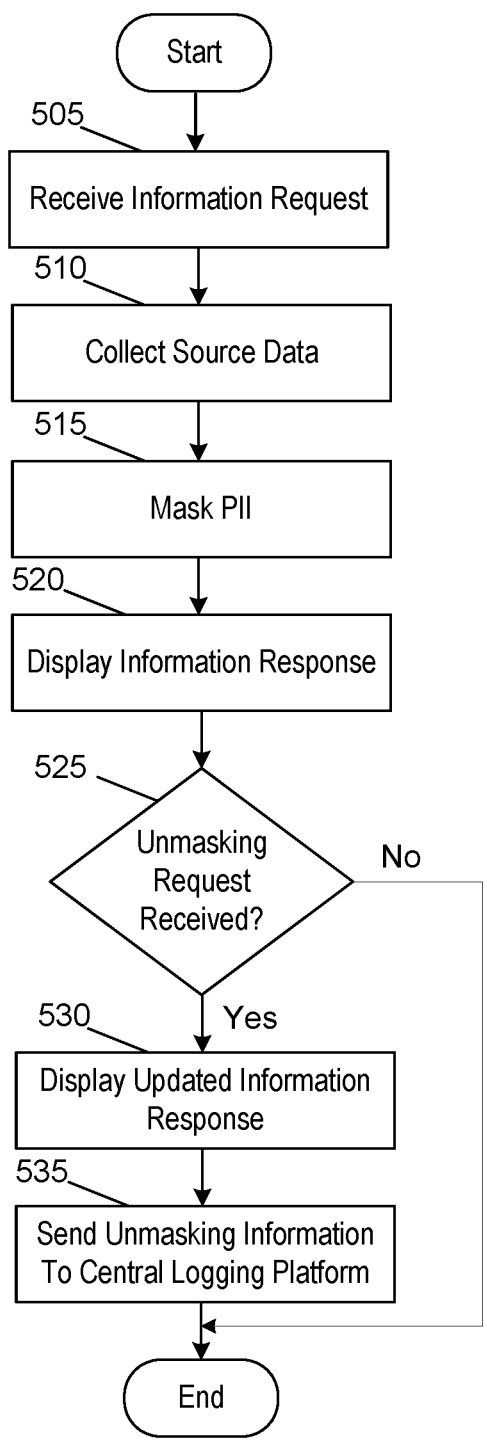
FIG. 5 depicts an illustrative method for PII footprint modeling by a user computing device in accordance with one or more example embodiments.

FIG. 5 depicts an illustrative method for PII footprint modeling by a user device in accordance with one or more example embodiments. Referring to FIG. 5, at step 505, a user device having at least one processor, a communication interface, and memory may receive an information request. At step 510, the user device may collect source data to respond to the information request. At step 515, the user device may mask PII included in the source data. At step 520, the user device may display an information response that does not expose the PII. At step 525, the user device may identify whether or not an unmasking request is received. If an unmasking request is not received, the method may end. If an unmasking request is received, the user device may proceed to step 530.

At step 530, the user device may display an updated information response that exposes the previously masked PII. At step 535, the user device may send unmasking information to a centralized information logging platform for analysis.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from a user computing device, a request to access information that includes personal identifiable information (PII);
   retrieve source data comprising the PII;
   mask, within the source data and based on at least one enterprise data management policy, the PII, resulting in masked information;
   send the masked information in response to the request to access the information;
   receive a request to unmask the masked information;
   unmask the PII, resulting in unmasked PII;
   log the request to unmask the masked information in an unmasking event log;
   send the unmasked PII in response to the request to unmask the masked information;

apply at least one machine learning model to the unmasking event log to identify one or more malicious events; and trigger one or more remediation actions based on identification of the one or more malicious events, wherein identifying the one or more malicious events comprises:

identifying that a number of requests for the PII by the user computing device exceeds a median number of requests for the PII by a predetermined number of standard deviations, wherein the requests are initiated by other user computing devices corresponding to users associated with a particular job title and wherein a user of the user computing device may also be associated with the particular job title.

2. The computing platform of claim 1, wherein masking the PII comprises masking, based on one or more of: an IP address, a location, or a job title corresponding to a user of the user computing device or the user computing device.

3. The computing platform of claim 1, wherein unmasking the PII comprises sending the corresponding source data that includes the PII.

4. The computing platform of claim 1, wherein unmasking the PII comprises modifying the masked information to expose the PII.

5. The computing platform of claim 1, wherein the memory stores additional computer-readable instructions that, when executed by the at least one processor, cause the computing platform to:

identify, based on a network policy, whether or not the request to unmask the PII should be fulfilled, wherein unmasking the PII is in response to identifying that the request to unmask the PII should be fulfilled.

6. The computing platform of claim 5, wherein triggering the one or more remediation actions includes modifying the network policy.

7. The computing platform of claim 6, wherein modifying the network policy comprises revoking access permissions for the user computing device.

8. The computing platform of claim 7, wherein the access permissions for the user computing device are revoked for a temporary period of time.

9. The computing platform of claim 1, wherein identifying the one or more malicious events comprises:

comparing the PII to information that relates to a job title of the user of the user computing device;

based on identifying a match between the PII and the information that relates to the job title of the user of the user computing device, verifying a non-malicious event; and based on identifying that the PII does not match the information that relates to the job title of the user of the user computing device, identifying the one or more malicious events.

10. A method comprising:

at a computing platform comprising at least one processor, a communication interface, and memory:

receiving, from a user computing device, a request to access information that includes personal identifiable information (PII);

retrieving source data comprising the PII;

masking, within the source data and based on at least one enterprise data management policy, the PII, resulting in masked information;

sending the masked information in response to the request to access the information;

receiving a request to unmask the masked information;

unmasking the PII, resulting in unmasked PII;

logging the request to unmask the masked information in an unmasking event log;

sending the unmasked PII in response to the request to unmask the masked information;

applying at least one machine learning model to the unmasking event log to identify one or more malicious events; and triggering one or more remediation actions based on identification of the one or more malicious events, wherein identifying the one or more malicious events comprises:

identifying that a number of requests for the PII by the user computing device exceeds a median number of requests for the PII by a predetermined number of standard deviations, wherein the requests are initiated by other user computing devices corresponding to users associated with a particular job title and wherein a user of the user computing device may also be associated with the particular job title.

11. The method of claim 10, wherein masking the PII comprises masking, based on one or more of: an IP address, a location, or a job title corresponding to a user of the user computing device or the user computing device.

12. The method of claim 10, wherein unmasking the PII comprises sending the corresponding source data that includes the PII.

13. The method of claim 10, wherein unmasking the PII comprises modifying the masked information to expose the PII.

14. The method of claim 10, further comprising:

identifying, based on a network policy, whether or not the request to unmask the PII should be fulfilled, wherein unmasking the PII is in response to identifying that the request to unmask the PII should be fulfilled.

15. The method of claim 14, wherein triggering the one or more remediation actions includes modifying the network policy.

16. The method of claim 15, wherein modifying the network policy comprises revoking access permissions for the user computing device.

17. The method of claim 16, wherein the access permissions for the user computing device are revoked for a temporary period of time.

18. The method of claim 10, wherein identifying the one or more malicious events comprises:

comparing the PII to information that relates to a job title of the user of the user computing device;

based on identifying a match between the PII and the information that relates to the job title of the user of the user computing device, verifying a non-malicious event; and based on identifying that the PII does not match the information that relates to the job title of the user of the user computing device, identifying the one or more malicious events.

19. One or more non-transitory computer-readable media storing instructions that, when executed by a computing platform comprising at least one processor, a communication interface, and memory, cause the computing platform to:

receive, from a user computing device, a request to access information that includes personal identifiable information (PII);

retrieve source data comprising the PII;

mask, within the source data and based on at least one enterprise data management policy, the PII, resulting in masked information;
send the masked information in response to the request to access the information;
receive a request to unmask the masked information;
unmask the PII, resulting in unmasked PII;
log the request to unmask the masked information in an unmasking event log;
send the unmasked PII in response to the request to unmask the masked information;
apply at least one machine learning model to the unmasking event log to identify one or more malicious events; and
trigger one or more remediation actions based on identification of the one or more malicious events, wherein identifying the one or more malicious events comprises:
 identifying that a number of requests for the PII by the user computing device exceeds a median number of requests for the PII by a predetermined number of standard deviations, wherein the requests are initiated by other user computing devices corresponding to users associated with a particular job title and wherein a user of the user computing device may also be associated with the particular job title.

* * * * *